April 6, 1965  J. A. FRANKLIN  3,176,860
CAR DUMPING APPARATUS
Filed June 17, 1963  2 Sheets-Sheet 1
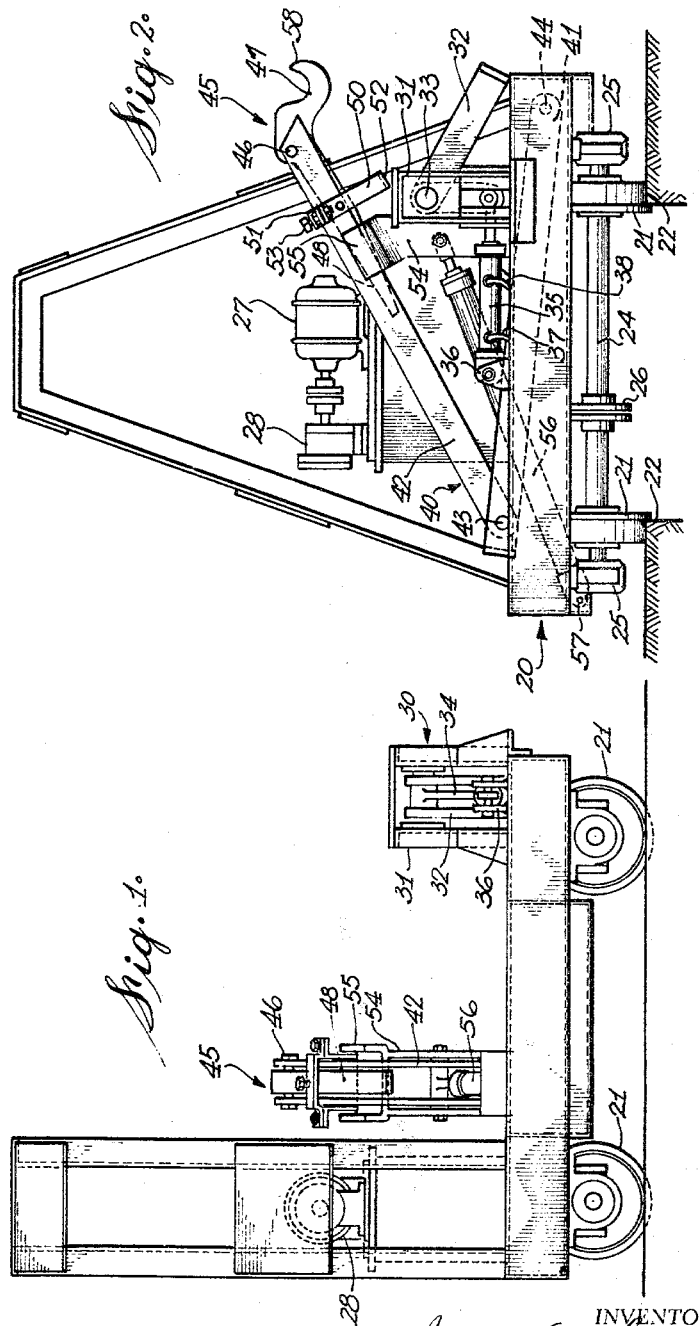
INVENTOR
John A. Franklin
BY
James A. Hamly
PATENT AGENT

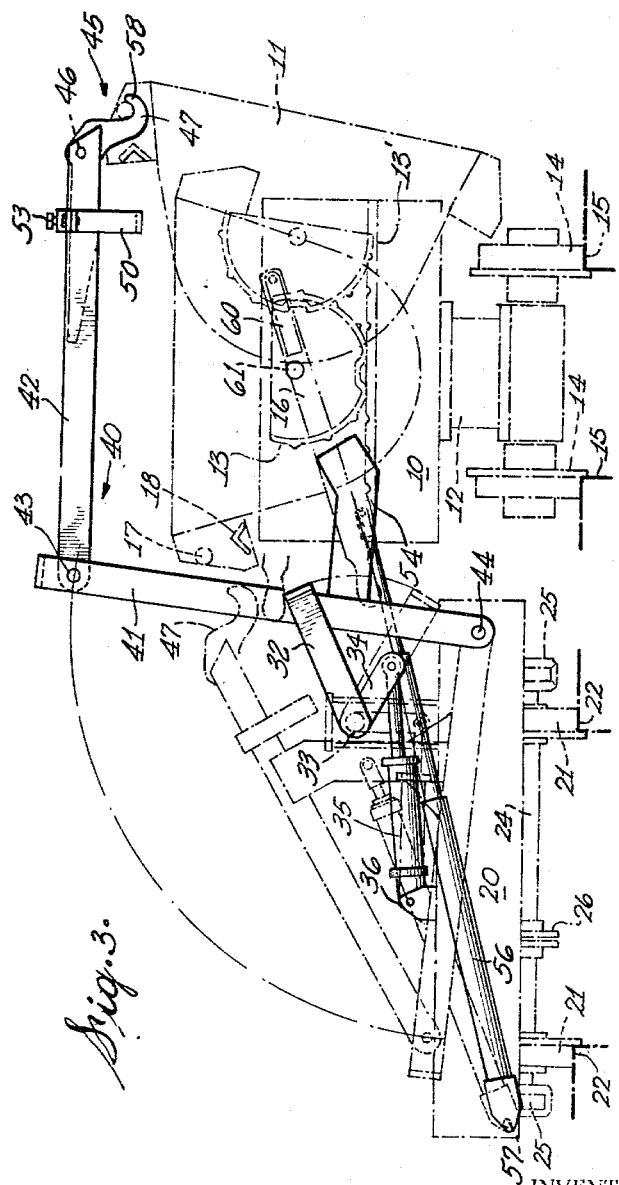

3,176,860
CAR DUMPING APPARATUS
John A. Franklin, Falconbridge, Ontario, Canada, assignor to Falconbridge Nickel Mines Limited, Falconbridge, Ontario, Canada
Filed June 17, 1963, Ser. No. 288,098
6 Claims. (Cl. 214—64)

This invention relates to an apparatus for dumping cars having a tiltably mounted car body, and in particular it relates to a car dumping apparatus having an improved mechanism for making engagement with the car body.

In the handling of loose material such as ore, it is known to use cars having a body tiltably mounted to an underframe which is provided with wheels for movement along a track. While each car could be provided with an integral dumping means for tilting the body of the car and dumping the contents, it is much more economical, particularly where the cars are normally dumped at the same location, to have a car dumping apparatus beside the track at the dumping location. Only a single car dumping apparatus, or more simply a car dumper, would then be required. In use the cars are moved along the track to a position adjacent the car dumper and the car dumper is operated to engage the car body and tilt it, thereby dumping the car contents.

The tiltable cars normally tilt to one side of the tracks and are provided with an engageable dumping stud. The car dumper has an arm which extends to engage the dumping stud and tilt the car body. After the contents of the car are dumped the arm retracts returning the car body to its upright or normal position. It is often difficult to ensure that the extending arm of the car dumper engages the dumping stud properly because the cars are subjected to rough treatment and heavy wear which causes the position of the dumping stud to vary from a desired datum from car to car.

It is therefore an object of the invention to provide in a car dumper for dumping a car with a tiltable body, an improved means on the car dumper for effecting engagement with the tiltable body.

It is another object of the invention to provide a car dumper having a reciprocatably movable arm with an improved car dumper hook of novel design for improved engagement with a dumping stud on a tiltable car body.

The present invention overcomes the problem of ensuring engagement between the car dumper and the dumping stud by providing a car dumper having a reciprocatably movable arm with a car dumper hook pivotally mounted in the extending end of the arm. The car dumper hook has a hooked portion on one side of the pivotal mounting and a heavier counterweight portion on the other side. Means are provided to limit the pivotal movement of the car dumper hook between a first position with the hooked portion lower and a second position wtih the hooked portion higher. A rest engages the car dumper hook urging it to an intermediate position between the first and second positions as the arm extends while permitting pivotal movement from the intermediate position towards the first or second positions to adapt the hooked portion for engagement with the dumping stud on the car body whether or not it is displaced from a desired datum.

The invention is described in more detail hereinafter with reference to the accompanying drawings, in which FIGURE 1 is a side view of a car dumper in accordance with a preferred embodiment of the invention, FIGURE 2 is an end view of the car dumper of FIGURE 1, and FIGURE 3 is a diagrammatic end view indicating the manner in which a car dumper in accordance with the invention engages and tilts the body of a tiltable car.

Referring for the moment very briefly to FIGURE 3, there is shown in phantom a car 10 of well known design. This type of car is frequently used for carrying ore, and for example, may be used to carry ore to a furnace and to discharge the ore into the furnace. In FIGURE 3, car 10 is shown as having a rack mounted body. That is, a tiltable body 11 has at each end a curved toothed member 13 engaging and supported by a rack 13' on an underframe 12. As the body 11 tilts the members 13 roll along the rack. However the car 10 could also have a pivotally mounted tiltable car body where the body 11 has a rotary support at each end providing a fixed axis about which tilting takes place. Cars with tiltable bodies are also well known and this invention may be used with any type of car having a tiltable body. In FIGURE 3 car 10 has wheels 14 mounted on underframe 12 engaging tracks 15 for movement of car 10 therealong. A locking lever 16 may be provided on car 10 which, when engaged, prevents body 11 from being tilted. One suitable known form of locking lever 16 has a block 60 secured to one side projecting towards body 11. The body 11 has a pin 61 projecting from the side thereof substantially centrally of member 13 to engage the end of block 60 in the locked position as shown in FIGURE 3. While pin 61 engages the end of block 60, the body 11 cannot tilt to the right as seen in FIGURE 3. The car 10 would normally be provided with another locking lever at the other end extending towards the opposite side which would lock the body 11 from tilting movement to the left. When lever 16 is raised, pin 61 may move beneath block 60, permitting body 11 to tilt to the right. Once pin 61 moves under block 60, the blocking lever may be released without affecting the tilting. As body 11 is returned towards its central position, the pin 61 engages the underside of block 60 raising the lever 16. When pin 61 reaches the end of block 60, lever 16 drops to its locked position with pin 61 engaging the end of block 60. In normal operation the lever 16 is moved to its released position just prior to the tilting of body 11 to dump its contents. A dumping stud 17 on an upper side of body 11 is provided to be engaged by the dumping mechanism. Also, an angle 18 may be provided below stud 17 to aid in guiding the dumping mechanism into engagement with stud 17. The manner in which the engagement and tilting is accomplished will be described subsequently.

Referring now to FIGURES 1 and 2, a preferred form of a car dumper is shown having a carriage 20 with wheels 21 which engage tracks 22. The tracks 22 extend parallel to tracks 15 (FIGURE 3) and are spaced to one side. The tracks 22 are at the location where dumping of cars 10 is required. Each pair of wheels 21 may be mounted on a connecting axle 24 carried in bearings 25 on carriage 20. One of the axles 24, as seen in FIGURE 2, may be a drive axle with a sprocket 26 secured to it. A chain engages sprocket 26 and is driven by a motor (not shown) carried by carriage 20 to rotate the axle and move the car dumper along tracks 22 to a particular location thereon.

A motor 27, which may be an electric motor run by batteries carried on carriage 20, is mounted above and on carriage 20. The motor 27 is coupled to drive a hydraulic pump 28 which supplies hydraulic fluid under pressure to actuate pistons for operating the car dumper as will be described subsequently, and may also supply fluid to drive the previously mentioned motor (not shown) for driving sprocket 26 and moving the car dumper.

A trip mechanism 30 for moving the locking lever 16 (FIGURE 3) from its engaged position to its released position is mounted on carriage 20. The trip mechanism 30 comprises a support 31 projecting upwards from carriage 20 and with a trip lever 32 pivotally mounted to support 31 at a pivotal mount 33. An arm 34 is secured to, or is formed integrally with, trip lever 32 and extends towards carriage 20. A hydraulic cylinder 35 has its base pivotally connected to carriage 20 at mount 36 and has the end of its extending center member pivotally connected to the end of arm 34. Two hydraulic lines 37 and 38 conduct hydraulic fluid to and from cylinder 35 at the control of an operator to move trip lever 32 from a rest position (as shown in FIGURE 2) to a trip position (as can be seen in FIGURE 3 in solid lines).

Also mounted on carriage 20 is a reciprocatably movable arm 40 which may, in a preferred form, comprise a lower member 41 and an upper member 42 pivotally connected to one another at 43. The other end of the lower member 41 is pivotally connected to carriage 20 at a pivotal mount 44 on the side of carriage 20 towards the cars to be dumped. The other end of upper member 42 carries a car dumper hook 45 which is pivotally connected to member 42 at pivotal mounting 46. The car dumper hook 45 has a stud engaging hooked portion 47 on one side of the pivotal mounting 46 projecting outwardly of member 42, and a heavier counterweight portion 48 on the other side of pivotal mounting 46. A bracket 50 on upper member 42 has an upper and a lower cross-piece 51 and 52 spaced from one another. The upper and lower cross-pieces 51 and 52 are positioned to engage the upper and lower sides of the counterweight portion 48 and thus limit the pivotal movement of the car dumper hook 45. When counterweight portion 48 is engaged with cross-piece 51, the hooked portion 47 is carried in a lower position, and when the counterweight portion 48 is engaged with cross-piece 52, the portion 47 is higher. An adjustable bolt 53 is threadedly mounted in cross-piece 51 to adjust the limit of pivotal movement of the car dumper hook in that direction.

A rest 54 is mounted to lower arm member 41 projecting away from arm member 41 and terminating in a generally U-shaped arm engaging portion 55. When the movable arm 40 is in its retracted position, the upper arm member 42 rests in the arm engaging portion 55 of rest 54 as shown in FIGURES 1 and 2. Also, when in this position the counterweight portion 48 rests in the arm engaging portion 55 so that the car dumper hook 45 is in an intermediate position between the positions where it would engage cross-piece 51 or 52. Preferably the counterweight portion 48 is supported in a position closer to cross-piece 51 than to cross-piece 52 as will be discussed hereinafter.

In order to move the arm 40 between its retracted position and its extended or dumping position, a hydraulic cylinder 56 has its base pivotally connected to carriage 20 at pivotal mount 57 and the end of its movable or extending center member pivotally connected to rest 54. Hydraulic fluid under pressure from pump 28 may be fed to cylinder 56 at an operator's control to extend and retract the movable arm 40.

Referring once again to FIGURE 3, the manner in which the car dumper operates will be described. The at rest position of trip lever 32 and the retracted position of the arm 40 are indicated in phantom, and the car dumper is positioned adjacent car 10 with the lever 32 and arm 40 in these positions. The trip mechanism 30 is then operated by directing hydraulic fluid to the hydraulic clyinder 35 causing it to extend and swinging trip lever 32 to its trip position as indicated in solid lines in FIGURE 3. As the trip lever 32 moves to its trip position, it engages locking lever 16 moving it to its released position where body 11 is free to tilt. Hydraulic fluid is then directed to cylinder 56 causing it to extend. The movable arm assembly 40 begins to pivot about pivotal mount 44 and the hooked portion 47 moves towards stud 17. If the stud 17 were in exactly the same position on every car, the hooked portion 47 would engage stud 17, and as arm 40 continued to extend the body 11 would be tilted and the upper member 42 would be raised off rest 54 until the arm 40 reached the position shown in solid lines in FIGURE 3 where the contents of body 11 would be dumped.

As was previously pointed out, the position of stud 17 may vary from car to car, that is, it may vary from a desired datum. Suppose, for example, that stud 17 is too high on a particular car for direct engagement, then as arm 40 extended, the end of hooked portion 47 would engage angle 18. The angle 18 presents an upwardly inclined sloping surface to the approaching hooked portion. The end of hooked portion 47 would ride up the sloping side of angle 18 causing a pivotal movement of the car dumper hook 45 about mounting 46 to a position where the hooked portion 47 was higher. As the car dumper hook 45 makes this pivotal movement, the counterweight portion 48 is forced downwards against rest 54 causing the upper member 42 of arm 40 to be raised from rest 54 to a higher postion. Thus, the upper member 42 is raised and the car dumper hook 45 is rotated to make hooked portion 47 higher. This continues until the hooked portion 47 engages the stud 17 and the body 11 is tilted as before.

Suppose now that the stud 17 is too low for direct engagement, then as arm 40 extends the tip 58 of the hooked portion 47 engages the side of stud 17. The tip 58 of hooked portion 47 is curved back towards the main body of the car dumper hook so that the stud tends to move it downwards, causing the car dumper hook 45 to pivot about mounting 46 until the tip of hooked portion 47 passes below stud 17 and the hooked portion moves into engagement with stud 17.

It will be apparent that in the embodiment shown, there is a limited part of the hooked portion 47 (i.e. tip 58) which will cause pivotal movement of the car dumper hook 45 to lower the hooked portion 47. Consequently, the pivotal movement in this direction (clockwise in FIGURE 3) would not be large. On the other hand, when the hooked portion 47 engages the sloping side of angle 18 causing pivotal movement of car dumper hook 45 to raise hooked portion 47, a considerable amount of pivotal movement (counter clockwise in FIGURE 3) can be accommodated. It is because of this that the car dumper hook 45 is supported by rest 54 when arm 40 is retracted, with the counterweight portion 48 closer to cross-piece 51 than cross-piece 52, thereby permitting more pivotal movement in a counter clockwise direction than a clockwise direction. It is also because of this that the car dumper is normally arranged so that when arm 40 extends the hooked portion 47 is below stud 17 and the hooked portion 47 must be raised.

It should be noted that when arm 40 is extended as shown by solid lines in FIGURE 3, the angle 18 has moved to a position behind the hooked portion 47. The stud 17 cannot slip out of the hooked portion 47 until the arm 40 is retracted. With some types of car there is a tendency for the car to overturn as it is being dumped. The car dumper of this invention overcomes such a tendency because the stud 17 is held in the hooked portion 47 while the dumping arm is extended. Also, with a rack mounted car body 11 such as is shown, the body is normally tilted to a position such that it will not return under the influence of gravity. The car dumper of this invention is able to apply a positive returning force to the car body.

It is believed that the car dumper in accordance with this invention is able to be positioned adjacent a car with a tiltable body and an engageable dumping stud, and engage the dumping stud even if it is displaced from a desired location, to dump the contents of the car. If desired, the car dumper may be moved along tracks 22 during the actual dumping, and would thus move the car to which it is attached during dumping to spread the dumped contents of the car.

I claim:
1. A car dumper comprising a frame,
a reciprocatably movable arm on said frame having a retracted position and an extended car dumping position,
a car dumper hook pivotally mounted on the extending end of said arm having a hooked portion on one side of the pivotal mounting projecting outwardly of said arm,
means on said arm limiting the pivotal movement of the car dumper hook between a first position with said hooked portion lower and a second position with said hooked portion higher, and
rest means engaging said car dumper hook when said arm is in its retracted position and urging said car dumper hook to an intermediate position between said first and second positions as said arm extends.

2. A car dumper comprising,
a carriage,
a reciprocatably movable arm on said carriage having a retracted position and an extended car dumping position,
a car dumper hook pivotally mounted on the extending end of said arm and having a stud engaging hooked portion on one side of the pivotal mounting projecting outwardly of said arm and a counterweight portion on the other side of said pivotal mounting,
means on said arm engaging said car dumper hook and limiting the pivotal movement of said car dumper hook between a first position with said hooked portion lower and a second position with said hooked portion higher, and
a rest engaging said car dumper hook when said arm is in its retracted position urging said car dumper hook to an intermediate position between said first and second positions as said arm extends and permitting pivotal movement from said intermediate position towards said first and second positions responsive to external guiding forces.

3. A car dumper for dumping a car having a tiltably mounted body with an engageable dumping stud thereon whose position varies from a desired datum, comprising
a carriage,
a reciprocatably movable arm on said carriage having a retracted and an extended position,
a car dumper hook pivotally mounted on the extending end of said arm and having a stud engaging hooked portion on one side of the pivotal mounting projecting outwardly of said arm and a heavier counterweight portion on the other side of said pivotal mounting,
a bracket mounted on said arm having an upper and a lower cross-piece respectively engageable with upper and lower sides of said counterweight portion limiting the pivotal movement of said car dumper hook between a first position with said hooked portion lower and a second position with said hooked portion higher, and
a rest carried by said carriage supporting said arm in its retracted position and engaging said counterweight portion, said rest urging said car dumper hook to an intermediate position between said first and second positions as said arm extends and permitting pivotal movement from said intermediate position adapting said car dumper hook for engagement with said stud.

4. A car dumper for dumping a car having a tiltably mounted body, an engageable dumping stud on said body whose position varies from a desired datum and an angle member on said body positioned below said stud, comprising
a carriage,
a reciprocatably movable arm on said carriage having a retracted and an extended position,
a car dumper hook pivotally mounted on the extending end of said arm and having a stud engaging hooked portion on one side of the pivotal mounting projecting outwardly of the end of said arm and a heavier counterweight portion on the other side of said pivotal mounting,
a bracket mounted on said arm having an upper and a lower counterweight engaging cross-piece limiting the pivotal movement of said car dumper hook between a first position with said hooked portion lower and a second position with said hooked portion higher, and
a rest carried by said carriage supporting at least part of said arm in its retracted position and engaging said counterweight urging said car dumper hook to an intermediate position betwen said first and second positions, said stud and said angle member serving as guides for said hooked portion as said arm moves from its retracted to its extended position to cause pivotal movement of said car dumper hook guiding said hooked portion into engagement with said stud, said angle member maintaining engagement as said arm extends to its fully extended position to tilt the car body.

5. A car dumper as defined in claim 4 and further comprising an adjustable bolt threadedly mounted in the upper cross-piece and having a counterweight engageable end, said bolt adjusting the first position limit of movement of the car dumper hook.

6. A car dumper as defined in claim 4 in which the angle member presents an upwardly inclined guiding surface to the hooked portion approaching it.

References Cited by the Examiner
UNITED STATES PATENTS
2,226,875  12/40  Rexford _____ 214—64 X
FOREIGN PATENTS
331,307  1/21  Germany.

HUGO O. SCHULZ, *Primary Examiner.*